United States Patent [19]

Chevalier

[11] Patent Number: 5,767,969
[45] Date of Patent: Jun. 16, 1998

[54] GYROMETRIC DETECTION METHOD AND SAMPLED OPTICAL GYROMETER TO IMPLEMENT SAID METHOD

[75] Inventor: Jean-René Chevalier, Chatellerault, France

[73] Assignee: Sextant Avionique, Velizy Villacoublay, France

[21] Appl. No.: 645,898

[22] Filed: May 14, 1996

[30] Foreign Application Priority Data

May 24, 1995 [FR] France .................. 95 06428

[51] Int. Cl.[6] .................................. G01C 19/72
[52] U.S. Cl. .................................. 356/350
[58] Field of Search .......................... 356/350

[56] References Cited

U.S. PATENT DOCUMENTS 4,514,088  4/1985  Coccoli ...................... 356/350
4,658,401  4/1987  Segre et al. .................. 356/350
4,661,964  4/1987  Haavisto ..................... 356/350

FOREIGN PATENT DOCUMENTS 0 383 587 A1  8/1990  European Pat. Off. .......... 356/350

Primary Examiner—Samuel A. Turner
Attorney, Agent, or Firm—Browdy and Neimark

[57] ABSTRACT

The gyrometric detection device embodying the invention comprises an annular optical guide comprising two optical couplers, a controllable-frequency light radiation source connected to the inputs of the two couplers via two optical switches driven alternately by a sampling clock so as to obtain emission, in the guide, of a succession of rotating wave trains and counter-rotating wave trains, a circuit for modulating the radiation emitted by the source, a control loop regulating the frequency of the radiation emitted by the source so as to syntonize it with the guide resonance frequency, and a circuit for measuring the intensity of the light radiation of the wave trains transmitted by the second coupler. The invention enables the overcoming of the disturbing effects of backscattering and of the Kerr effect.

5 Claims, 2 Drawing Sheets

GYROMETRIC DETECTION METHOD AND SAMPLED OPTICAL GYROMETER TO IMPLEMENT SAID METHOD

BACKGROUND OF THE INVENTION

1. Field of the Invention

This invention relates to a gyrometric detection method and a sampled optical gyrometer to implement said method.

More particularly, it relates to a method using an optical gyrometer which uses an optical guide such as e.g. a resonant cavity in which are propagated two laser radiation waves circulating in opposite directions, i.e. a rotating wave and a counter-rotating wave.

2. Description of the Prior Art

In a conventional gyrometer of this type, the two waves circulate simultaneously in the cavity. An automatic control circuit enables these two waves to be controlled by resonance. Various implementation means then enable the obtaining of a electric representation of the difference in resonance frequencies seen by each of these waves; this difference being proportional to the speed of rotation $\Omega$.

Experience has shown the accuracy of these gyrometers to be limited due to two disturbances, namely backscattering and the Kerr effect.

Indeed, part of the rotating wave is backscattered and interferes with the counter-rotating wave, and vice versa. This backscattering phenomenon therefore generates a relatively loud noise (up to $10^6$°/h).

In an endeavour to overcome this backscattering phenomenon, numerous methods have been proposed leading to a modulation of one of the two waves in order to subject it to a spectral shift. However, these solutions have proved costly and quite awkward to implement.

The Kerr effect stems from the fact that if the. optical intensity of a wave is very high, the wave rotating in the opposite direction observes a local variation of the index n of the medium in which it is propagating. Accordingly, the length of the optical path traveled by this wave varies and the gyrometric data detected are therefore vitiated.

OBJECT OF THE INVENTION

The main object of this invention is to remedy the preceding disadvantages, particularly to improve the gyrometer by overcoming these two effects.

SUMMARY OF THE INVENTION

Accordingly, there is provided a method using a laser wave generator capable of emitting, in an annular optical guide, luminescent wave trains of two different types, namely one train of rotating waves and one train of counter-rotating waves, and a means for detecting the intensity of the light waves propagating in the guide.

According to the invention, this method comprises at least one sequence comprising the following successive phases:

a first phase during which there is generated in the guide a first train of a first type of modulated waves, and the frequency of emission of this wave train is controlled by the resonance frequency of the cavity by acting on the intensity of the current supplying the laser generator as a function of the intensity of the light waves detected by said detection means and processed by a synchronous demodulator, a second phase during which the emission of the first type of waves is interrupted for a period sufficiently long to enable the evanescent wave resulting from that emission to become completely attenuated by the guide, a third phase during which there is generated, in the guide, a train of modulated waves of the second type while maintaining the intensity of the supply current at the value it had after the first phase, and a gyroscopic signal is produced from the signal supplied by said detector during this third phase and is demodulated by said demodulator, a fourth phase during which the emission of waves of the second type is interrupted for a period sufficiently long to enable the evanescent wave resulting from that emission to become completely attenuated by the guide.

It is obvious, from these arrangements, that only one wave train is rotating at any one time in the guide, to the extent that the negative effects of both backscattering and the Kerr effect are avoided.

The sequence previously defined can, of course, be repeated periodically, with a period at least equal to the cumulative duration of the four phases of this sequence.

An optical gyrometer serving to implement the method previously described can then comprise:

an annular optical guide comprising two optical couplers situated in two opposite locations and each comprising an input intended to receive incident light radiation, an output equipped with an opto-electronic detector, possibly a common one, a means enabling a fraction of the radiation applied to the input to be transferred into the guide, and a means enabling a fraction of the radiation propagating inside the guide to be transferred to the output, while ensuring that this propagation continues inside the guide, a controllable-frequency light radiation source connected to the inputs of the two couplers via two electrically-controllable optical switches piloted alternately by a sampling clock so as to obtain emission, in the guide, of a succession of rotating wave trains and counter-rotating wave trains, a means for modulating the light radiation emitted by the source, a control loop regulating the frequency of the radiation emitted by the source as a function of the intensity detected of the wave trains emitted by one of the couplers and partially reflected on the output of that first coupler, so as to tune the frequency of this radiation with the resonance frequency of said guide, and a circuit for measuring the intensity of the light radiation of the wave trains emitted by the second coupler and partially reflected at the output of this second coupler, this measuring circuit comprising a means enabling the supply of a a gyrometric signal resulting from the mismatch produced by a rotation of the guide between the frequency of the radiation and the frequency of the resonance.

In this circuit, the control loop can comprise a first sample-and-hold circuit timed by the sampling clock to hold, during the emission periods of the second coupler, the signal supplied by the detector during the emission of wave trains by the first coupler.

The measuring circuit can comprise a second sample-and-hold circuit timed by the sampling clock to hold, during the emission periods of the first coupler, the signal supplied by the detector during the emission of wave trains by the second coupler.

BRIEF DESCRIPTION OF THE DRAWINGS

Further features and advantages of the invention will be apparent from the embodiment of the invention described, by way of a non-limiting example, in reference to the corresponding accompanying drawings in which.

DESCRIPTION OF THE PREFERRED EMBODIMENTS

Figure 1:
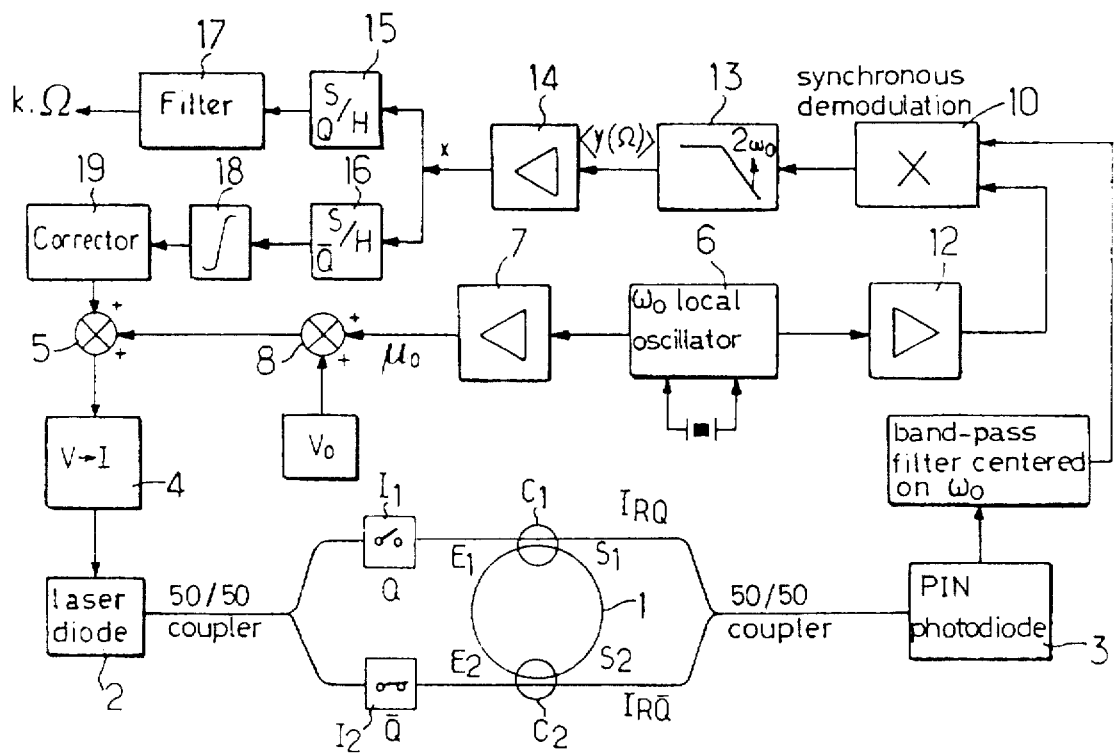
FIG. 1 is a skeleton diagram of a sampled optical gyrometer embodying the invention.

In the example schematically represented in FIG. 1, the optical guide of the gyrometer has been schematically represented in the form of an annular cavity 1 comprising two optical couplers $C_1$, $C_2$ each including an input $E_1$, $E_2$ connected to the source of the laser radiation emission 2 via an optical circuit comprising a controllable optical switch $I_1$, $I_2$ and a reflected output $S_1$, $S_2$ connected to an opto-electronic detector 3.

Figure 2:
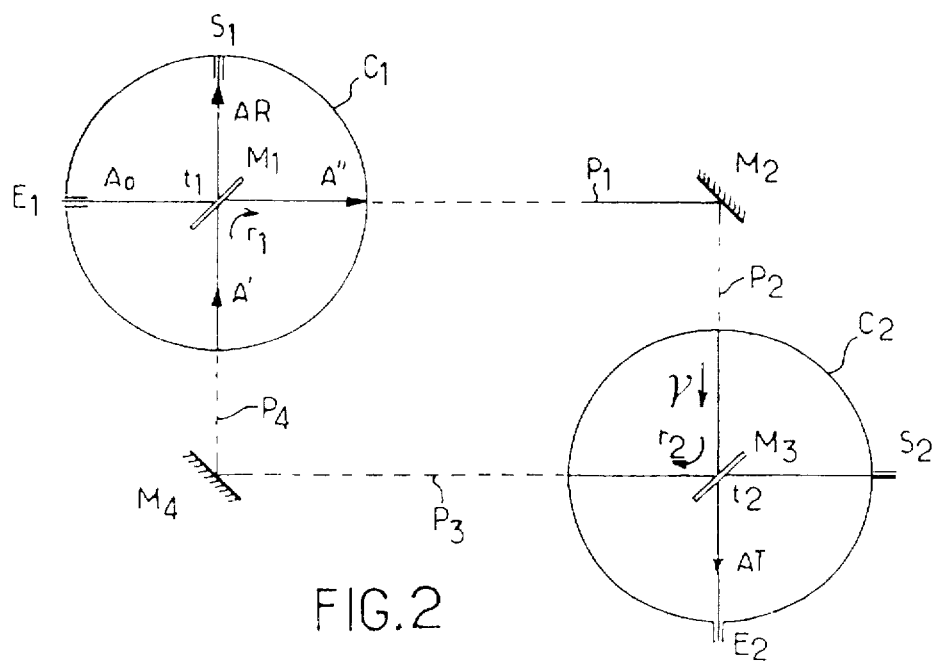
FIG. 2 is a schematic representation of an optical guide equipped with the two couplers.

The operating principle of this optical guide and its couplers will be explained hereinunder in reference to FIG. 2 which schematically represents a square or rectangular-shaped guide comprising four rectilinear paths $P_1$ to $P_4$ and four reflecting mirrors $M_1$ to $M_4$ extending respectively at the four angles, perpendicular to their bisectors.

In this example, the couplers $C_1$, $C_2$ equip two opposite right angles of the guide and are constituted by the mirrors $M_1$ and $M_3$. To this end, these mirrors $M_1$ and $M_3$ are semi-transmissive for angles of incidence at 45°. For such an incidence, they have a coefficient of reflection $r_1$, $r_2$ and a coefficient of transmission $t_1$, $t_2$.

The light wave Ao supplied by the source 2, via the optical switch $I_1$ and which is present at the input $E_1$, is projected onto the outer side of the mirror $M_1$, along the axis of path $P_1$. Accordingly, a fraction AR of this wave is reflected towards the output $S_1$ of the coupler $C_1$, along the axis of path $P_4$, while another fraction of this wave A" is transmitted by the mirror $M_1$ along the axis of path $P_1$. This fraction A", which is almost entirely reflected by the mirror $M_2$, propagates along the path $P_2$ in the rotating direction and then attacks the mirror $M_3$ of the coupler $C_2$.

One fraction of the wave received by this mirror $M_3$ is transmitted to the input $E_2$ of the coupler $C_2$ (which is on the axis of path $P_2$) whereas another fraction A' is reflected along the path $P_3$. After being reflected in the mirror $M_4$, this last fraction A' propagates along the path $P_4$ to attack the coupler $C_1$. The latter transmits a new fraction of the wave A' towards its output $S_1$ while it reflects a complementary fraction along the path $P_1$.

Application, to the input $E_2$ of the coupler $C_2$, of a light wave coming from the light source 2 via the optical switch $I_1$, produces a similar process; in this case the wave propagates in the opposite direction in the guide (counter-rotation). In this case also, a fraction of the wave applied to the coupler is transmitted to its output $S_2$ after traveling a complete revolution of the guide.

This process (in the case of the coupler $C_1$) is governed by the following set of equations:

$$AR = t_1A' + r_1Ao \quad A" = t_2Ao + r_1A'$$
$$A' = \gamma e^{j\phi}r_2A" \quad AT = \sqrt{\gamma e^{j\phi}} \cdot t_2A"$$

wherein:

Ao is the amplitude of the wave applied to the input $E_1$ of the coupler $C_1$

AR is the amplitude transmitted to the output $S_1$ by the coupler $C_1$

A" is the amplitude of the wave reflected along the path $P_1$ by the coupler $C_1$ A' is the amplitude of the wave reflected along the path $P_3$ by the coupler $C_2$ AT is the amplitude of the wave transmitted towards the input $E_2$ by the coupler $C_2$ $\gamma$ is the attenuation of the wave in the guide expressed as amplitude/revolutions $\phi$ is the phase shift accumulated by the wave after one revolution of propagation This set of equations is resolved as follows:

$$AR = Ao \cdot \frac{r_1 - r_2 \gamma e^{j\phi}}{1 - Ze^{j\phi}}$$

$$AT = Ao \cdot \frac{t_1 - t_2\sqrt{\gamma e^{j\phi}}}{1 - Ze^{j\phi}}$$

From the amplitude AR can be obtained the standardized intensity IR of the reflected wave at the output of the coupler:

$$\widetilde{IR} \stackrel{\Delta}{=} \frac{IR}{Io} = 1 - \frac{K_1[1 - (1 - K_2)\Gamma]}{1 + Z^2 - 2Z\cos\phi}$$

wherein:

IT is the reflected intensity

Figure 5:
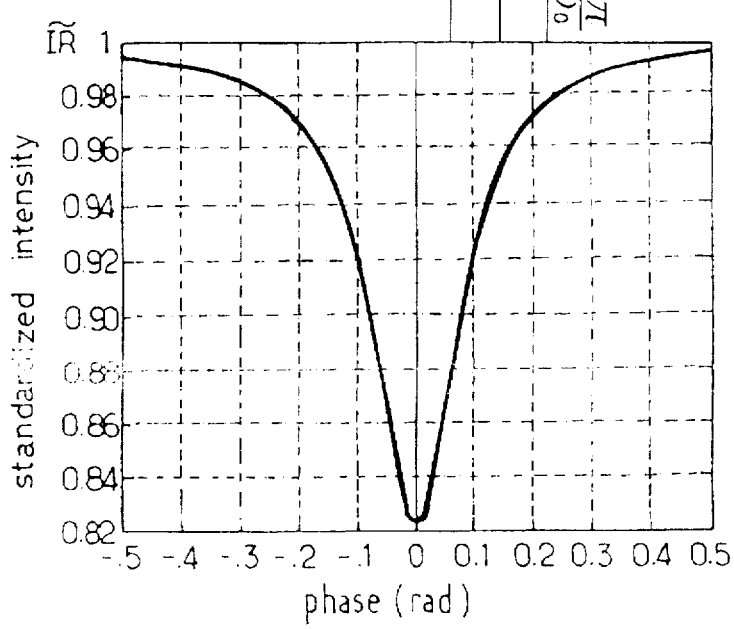
FIG. 5 is a diagram showing the varia in the standardized reflected intensity of the radiation at the output of for as a function of the phase (in radians), in the vicinity of the resonance of the cavity.

Io is the intensity of the wave applied to the input of the coupler $K_1$ and $K_2$ are constants $\Gamma = \gamma^2$ FIG. 5, which shows the variations of the standardized intensity IR as a function of the variations in the frequency of the wave, shows that, at the resonance frequency of the guide, the standardized intensity IR is at a minimum point.

Figure 3:
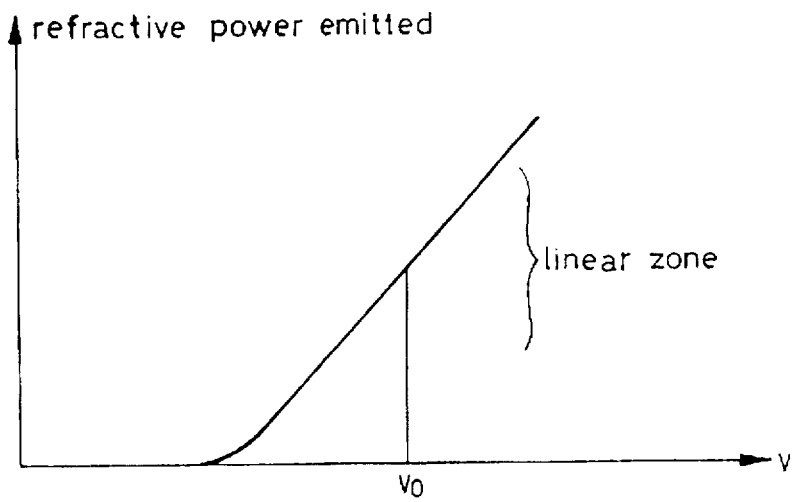
FIG. 3 is a diagram representative of variations in the power emitted by the laser diode used in the gyrometer in FIG. 1, as a function of its serviceable voltage v.
Figure 4:
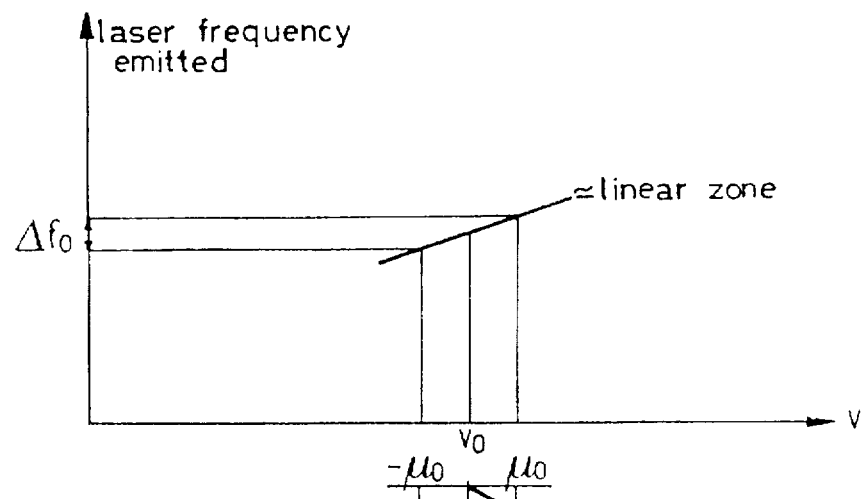
FIG. 4 is a diagram representative of the variation the frequency of the radiation of the laser diode as a function of its supply voltage.

The features of the light wave emitting source are indicated in FIGS. 3 and 4.

FIG. 3 shows that a variation of the serviceable voltage v of the source 2 (in this instance a laser diode) entails a substantially linear variation about a nominal value vo.

Likewise, a variation such as the one produced by modulation about the nominal voltage vo (e.g. of the $\mu o \sin \omega \tau$ type) generates a variation $\Delta fo$ of the frequency of the light wave emitted in the guide.

The invention is more particularly based on the fact that a modulation of the electrical intensity of the source 2 translated by a modulation of its emitting frequency $\Delta fo$ is equivalent to a modulation $\Delta\phi$ of the phase between the waves at the entrance to the cavity and after one revolution, and that it is therefore possible to relate the speed of rotation $\Omega$ of the cavity with the frequency of the light wave corresponding to the resonance.

Thus, in the event of a circular-shaped optical guide of radius Ro being used, the formula expressing this relation is as follows:

$$\Delta fo = \frac{2Ro}{\lambda o \eta e} \Omega$$

wherein:

$\lambda o$ is the wavelength of the wave emitted by the laser source, $\eta e$ is the effective index of the mode guided by the cavity The invention uses this particularity to generate a gyroscopic signal representative of the speed of rotation $\Omega$.

To this end, the laser radiation source 2 is powered by a current generator with controllable voltage 4, via an adder 5 whose two inputs are respectively connected to a control loop and to a generator of serviceable voltage supplying a voltage of $v=vo+\mu o \sin \omega \tau$ form. This modulation is obtained by means of a local oscillator 6 of which the voltage at output, amplified by an amplifier 7, is applied to one of the inputs of an adder 8 whose second input receives the voltage vo.

The output of the opto-electronic detector 3, which in this instance consists of a photodiode, is connected to a synchronous demodulator 10 via a preamplifier and a bandpass filter 11 centered on the pulse $\omega o$ of the local oscillator 6.

The principle governing the detection of the speed of rotation $\Omega$ is then as follows:

As previously mentioned, the reflected intensity IR is expressed as follows:

$$IR = Io \left[ 1 - \frac{K_1[1-(1-K_2)\Gamma]}{1 + Z^2 - 2Z\cos\phi} \right]$$

The following limited development is used:

$$f(x) = \frac{1-x^2}{1-2x\cos\theta + x^2} = 1 + \sum_{n=1}^{\infty} 2x^n \cos n\theta$$

When this is applied to the resonance of the integrated optical gyrometer, we obtain:

$$IR(\Delta\phi) = Io \left\{ 1 - \frac{K_1[1-(1-K_2)\Gamma]}{1-Z^2} \right\} - \frac{2K_1[1-(1-K_2)\Gamma]Io}{1-Z^2}$$

$$\sum_{n=1}^{\infty} Z^n \cos n\phi$$

The laser diode is modulated to the frequency:

$$\tilde{f} = \frac{\tilde{\omega}}{2\pi}$$

with the modulation depth corresponding to a phase $\Psi$, whence $$\Delta\phi = \phi 2 = \psi \sin\tilde{\omega} t + \frac{8\pi^2 Ro^2}{\lambda o C} \Omega$$

for the counter-rotating wave, as the control is in relation to the direct wave ($\phi 1=0$).

For the wave circulating in the ring during the measurement phase, we will obtain:

$$IR(\Omega) = Io \left\{ 1 - \frac{K_1[1-(1-K_2)\Gamma]}{1-Z^2} \right\} - \frac{2K_1[1-(1-K_2)\Gamma]Io}{1-Z^2}$$

-continued $$\sum_{n=1}^{\infty} \left\{ Z^n \cos\left[ n\left( \psi\sin\tilde{\omega}t + \frac{8\pi^2 Ro^2}{\lambda o C} \Omega \right) \right] \right\}$$

The cosine can be developed as a Bessel function, thus giving:

$$H_1(\Omega) = \left\{ \frac{4K_1Io[1-(1-K_2)\Gamma]}{1-Z^2} \right.$$

$$\left. \sum_{n=1}^{\infty} Z^n J_1(n\psi)\sin\left( \frac{8n\pi^2 Ro^2}{\lambda o C} \Omega \right) \right\} \cdot \sin\tilde{\omega}t$$

wherein $H_1(\Omega)$ is the IR $(\Omega)$ component carried by the pulse $\omega$.

The synchronous demodulation then consists in multiplying $H_1(\Omega)$ by $Ao \sin \omega t$ to obtain $$y(\Omega, t)\Delta A_1(\Omega) \cdot \sin\tilde{\omega}t \times Ao\sin\tilde{\omega}t$$

and therefore $$y(\Omega, t) = \frac{Ao}{2} A_1(\Omega)[1 - \cos 2\tilde{\omega}t]$$

This signal is transmitted, via a bandpass filter 13 of cut-off frequency $<<2\omega$ and an amplifier 14 at the input of two sample-and-hold circuits 15, 16 operating in opposite phase, at the rate of the sampling frequency used for the switching of the optical switches $I_1$, $I_2$.

In fact, the filter 13 enables the signal at $2\omega$ to be rejected by $y(\Omega, t)$, and a signal of the following shape to be obtained:

$$<y(\Omega)> = \frac{Ao}{2} A_1(\Omega) = \frac{2AoIoK_1[1-(1-K_2)\Gamma]}{1-Z_2}$$

$$\sum_{n=1}^{\infty} Z^n J_1(n\psi)\sin\left( \frac{8\pi Ro^2 n}{\lambda o C} \Omega \right)$$

The output of the sample-and-hold circuit 15, which is timed in synchronism with the optical switch $I_1$, supplies at output an analog signal which, once filtered (filter 17), is representative of the speed of rotation $\Omega$ of the gyrometer ($S=K\Omega$).

As for the output of the sample-and-hold circuit 16, it is transmitted to the second input of the adder 5 via an integrator 18 and a correcting circuit 19.

The optical switches $I_1$, $I_2$ and sample-and-hold circuits 15, 16 are controlled by means of a non-overlapping two-phase clock alternately supplying a signal Q and a complementary signal $\overline{Q}$, at a frequency such that, during each period, the evanescent wave present in the cavity can almost entirely expend itself.

The device previously described then operates as follows:

During a first phase $ph_1$, the signal $\overline{Q}$ is at the logic "1" level whereas the signal Q is at the logic "0" level. Accordingly, the optical switch 12 is closed and transmits the radiation from the source 2 to the coupler $C_1$, while the optical switch $I_1$ is open.

During this first phase $ph_1$, the wave transmitted by the coupler $C_2$ circulates in the counter-rotating direction in the guide. The luminous intensity detected by the detector 3 is filtered and demodulated and then transmitted after demodulation, via the sample-and-hold circuit 16 which is in the sampling phase, to the input of the adder 5, via the integrator 18 and the correcting circuit 19. The sample-and-hold circuit 15 is then in the hold state and supplies the voltage it had at the end of its previous sampling phase.

The regulation loop using the detector 3, the demodulator 10, the filters 11 and 13, the amplifier 14, the sample-and-hold circuit 16, the integrator 18, the correcting circuit 19 and the adder 5, acts so as to regulate the intensity of the supply current of the source and, therefore the frequency of the wave emitted, until the voltage x at output of the amplifier 14 passes through a minimum point. Cancellation of the voltage x means that the light wave emission frequency generated by the source 2 corresponds to the resonance frequency irrespective of the speed of rotation $\Omega$.

Given the fact that, during this first phase $ph_1$, there is only one wave in the guide, disturbance due to backscattering and the Kerr effect is avoided.

During a second phase $ph_2$, the signals Q and $\overline{Q}$ are switched to the logic "0" level. The duration of this phase is provided to enable the residual wave to die out in the cavity. During this phase $ph_2$, the two sampling circuits 15, 16 are in the hold state and respectively retain the values they held at the end of their respective previous sampling period. The duration of this phase is very short.

During a third phase $ph_3$, the signal $\overline{Q}$ is set to logic "0" whereas the signal Q is set to logic "1". Accordingly, during this period, the optical switch $I_2$ is open, whereas the optical switch $I_1$ is closed and transmits the radiation from the source to the coupler $C_1$.

During this third phase $ph_3$, the wave transmitted by the coupler $C_1$, which is not at the resonance frequency if $\Omega$ is not equal to 0, circulates in the guide in the rotating direction. The luminous intensity detected by the detector 3 is transmitted, after filtering, amplification and demodulation, to the sample-and-hold circuit 15 which is in the sampling phase. The signal S issued by this sample-and-hold circuit 15 is then proportional to the speed of rotation, if any, of the gyrometer (this signal is due to the mismatch $\Delta fo$ generated by the speed of rotation $\Omega$ of the gyrometer).

It should also be noted here that only one wave (rotating direction) is circulating in the cavity, thus also avoiding the effects of backscattering and the Kerr effect.

During a fourth phase $ph_4$, the signals Q and $\overline{Q}$ are set to logic "0" in the same manner, for the same reasons and during a first period, as in phase 2.

At the end of this fourth phase, the device starts off a new sequence beginning with another first phase $ph_1$ and so on so forth.

I claim:

1. A gyrometric detection method using a laser wave generator for emitting, in an annular optical guide having a resonance frequency, light wave trains of two different types, namely: one train type of rotating modulated light waves and one train type of counter-rotating modulated light waves, and a detection means for detecting the intensity of the light waves propagating in the guide, said method comprising at least one sequence comprising the following successive phases:

a first phase of emitting in the guide a first wave train of a first type of said two different train types, while the frequency of emission of said first wave train is slaved to the resonance frequency of the guide by acting on the intensity of a supply current supplying said laser generator, as a function of a signal representative of the intensity of the light waves, supplied by said detection means and processed by a synchronous demodulator, a second phase of interrupting the emission of wave train of the first type for a period sufficiently long to enable evanescent wave resulting from that emission to become completely attenuated by the guide, a third phase of emitting in the guide a second wave train of a second type of said two different train types while maintaining the intensity of the supply current at a value obtained after the first phase, a gyroscopic signal being produced from the signal supplied by said detection means during said third phase and processed by said demodulator, and a fourth phase of interrupting the emission of wave train of the second type for a period sufficiently long to enable evanescent wave resulting from that emission to become completely attenuated by the guide.

2. The method as claimed in claim 1, wherein the frequency of the wave train of the first type is controlled by means of a control loop filtering and sampling and holding with a sampling period corresponding to the emission period of the wave trains of the first type the signal supplied by said demodulator during said first phase, and integrating the sampled and held signal, the gyrometric signal being obtained by filtering and sampling and holding with a sampling period corresponding to the emission period of the wave trains of the second type the signal supplied by said demodulator during said third phase.

3. A device for gyrometric detection comprising:

an annular optical guide having a resonance frequency and comprising two optical couplers situated in two opposite locations and each comprising an input intended to receive incident light radiation, an output equipped with an opto-electronic detector, a means enabling a fraction of a radiation applied to the input to be transferred into the guide, and a means enabling a fraction of a radiation propagating inside the guide to be transferred to the output, while ensuring that this propagation continues inside said guide, a controllable-frequency light radiation source connected to the inputs of said two couplers via two respective electrically-controllable optical switches piloted alternately by a sampling clock so as to alternatively emit in said guide rotating wave trains and counter-rotating wave trains, a means for modulating the wave trains emitted by said source, a control loop for regulating the frequency of the wave trains emitted by said source as a function of the intensity of said wave trains detected by said detector and emitted by a first one of said couplers and partially reflected on the output of said first coupler, so as to tune the frequency of said wave trains to the resonance frequency of said guide, and a circuit for measuring the intensity of the light radiation of said wave trains emitted by a second one of said couplers and partially reflected on the output of said second coupler, this measuring circuit comprising a means enabling the supply of a gyrometric signal resulting from the mismatch between the frequency of the wave trains emitted by said source and the resonance frequency of the guide, produced by a rotation of said guide.

4. The device as claimed in claim 3, wherein said measuring circuit comprises, connected to the output of the detector, a synchronous demodulator, a bandpass filter, an amplifier and a first sample-and-hold circuit whose sampling period corresponds to the period of emission of the wave trains of the first type, this sample-and-hold circuit supplying said gyrometric signal.

5. The device as claimed in claim 3, wherein said modulating means comprises a local oscillator for modulating a polarization voltage, adding means for adding a compensating voltage coming from the control loop to said polarization voltage, the signal resulting from said adding means being applied to a voltage-controllable source of current powering the laser wave generator, said local oscillator piloting said synchronous demodulator.

* * * * *